March 31, 1970     G. REMMERS     3,503,658
HYDRODYNAMIC SLIDING BEARING FOR RADIAL AND AXIAL LOADS
Filed March 18, 1968

INVENTOR
GERRIT REMMERS

BY    *Frank R. ...*

AGENT

United States Patent Office 3,503,658
Patented Mar. 31, 1970

1

3,503,658
HYDRODYNAMIC SLIDING BEARING FOR
RADIAL AND AXIAL LOADS
Gerrit Remmers, Emmasingel, Eindhoven, Netherlands, assignor by mesne assignments, to U.S. Philips Corporation, a corporation of Delaware
Filed Mar. 18, 1968, Ser. No. 713,663
Claims priority, application Netherlands, Mar. 31, 1967, 6704590
Int. Cl. F16c 17/16, 19/12
U.S. Cl. 308—9
6 Claims

ABSTRACT OF THE DISCLOSURE

A self adjusting hydrodynamic sliding bearing having a cylindrical shaft with lubricant urging grooves positioned within a bore formed in a journal housing. The end of the shaft is spaced from the end of the bore to form a lubricant pressure chamber. The shaft when stationary has a point contact with the end of the bore to reduce starting rotational torque.

---

The invention relates to a hydrodynamic sliding bearing for receiving both radial and axial loads at the area of the end of a shaft, in which during operation of the bearing a lubricant between cooperating cylindrical surfaces of a stationary and a rotatable bearing part is urged to a pressure chamber which is situated near the end of the shaft between surfaces of said bearing parts located mainly at right angles to the axis of rotation, by means of an annular pattern of shallow helical grooves provided on one of said cylindrical surfaces.

In this known type of bearing the radial load-carrying capacity is obtained by the hydrodynamic lubricant pressure between the cylindrical bearing surfaces, at the area of the pattern of urging grooves themselves and also at the area of smooth parts of said cylindrical surfaces possibly present between the pattern and the pressure chamber. The axial load-carrying capacity of the bearing is obtained by the lubricant pressure in the pressure chamber. It is found that such bearings provided with a pattern of urging grooves as mentioned above, which ensure the pressure build-up in the lubricant can have a comparatively large load-carrying capacity with low frictional loss. Lubricants of varying types may be used in said bearings, for example, oil, grease, graphite, water.

Known bearings of this type, however, have the drawback that the favourable operating condition described can be reached only after surmounting a comparatively high static resistance and starting torque.

Known also are end-bearings in which a pattern of urging grooves is provided on at least part of a hemisphere. In said bearings the required starting torque is far smaller. However, the radial load-carrying capacity of the said spherical bearings is low.

In addition hydrodynamic sliding bearings are known in which a pattern of urging grooves is provided on a conical bearing surface. Said bearings are capable of providing satisfactorily high axial and radial load-carrying capacities but again at the expense of a large static resistance.

The invention provides a bearing of the type mentioned in the preamble in which the drawback of the required high starting torque is substantially avoided. The bearing according to the invention is characterized in that the surface of the rotatable bearing part which forms one wall of the pressure chamber has an approximately punctiform and centric contact place in common with any other bearing part in or on the further boundaries of the pressure chamber when the bearing is stationary.

The approximately punctiform surface or point contact can be realized in various manners. For example, the said surfaces of the bearing parts located at right angles to the axis of rotation may both, or either, of both, comprise a slightly spherical loss of a suitable shape. In a preferred embodiment of the bearing according to the invention, an approximately punctiform contact place is realized by arranging a spherical body in the pressure chamber between the said surfaces of the bearing parts, at least one of said surfaces being provided with a centric cavity. By this latter measure the spherical body which may simply be a ball which is mass-produced by known methods, will nearly always be arranged centrally in the pressure chamber so that also the desired contact place will be located at least near the axis of rotation of the bearing.

By the above described measures according to the invention, a bearing may be constructed with simple means which provides a high radial and axial load-carrying capacity and requires a low starting torque. According to the invention, a further refinement can be provided in an extremely simple manner. In this case the phenomenon is used that the two bearing parts, under the influence of the lubricant pressure in the pressure chamber increasing or decreasing as a result of the action of the pattern of urging grooves, experience a mutual axial displacement at least during starting of the bearing and also under given operating conditions. In this embodiment of the bearing according to the invention is achieved, by suitable choice of the location of the pattern of urging grooves, that such an axial displacement results in a decreasing or increasing urging effect of the pattern that the axial load-carrying capacity is adapted to the prevailing operating conditions (for example, bearing load, number of revolutions) within certain limits. For that purpose the embodiment according to the invention is characterized in that the pattern of urging grooves on one bearing part, viewed from said pattern, extends, at least when the bearing is stationary, to near or beyond that one of the two extreme edges of the smooth cylindrical surface of the other bearing part cooperating with this pattern during operation of the bearing which, at least on starting of the bearing, moves towards the centre of the pattern of urging grooves under the influence of the axial load-carrying capacity of the bearing building up. So the above-mentioned adaptation takes place in that the effective length of the pattern of urging grooves decreases and increases, respectively, when the two bearing parts are separated from one another or approach each other in the axial direction.

It is to be noted that a hydrodynamic sliding bearing of the type mentioned in the preamble is known in which means are provided which result in a self-adjusting effect as described above. For that purpose, said known sliding bearing comprises a return duct provided in the outermost of the two bearing parts, one end aperture of which is located centrally in the wall of the pressure chamber which extends at right angles to the axis of rotation of the bearing and forms part of said bearing part. An annular part of the surface of said wall located immediately around said aperture is very accurately finished and, in cooperation with the likewise very accurately machined part of the surface of the other bearing part which adjoins said surface when the bearing is stationary and is likewise located at right angles to the axis of rotation and also forms the boundary of the pressure chamber, constitutes in that condition of the bearing the seal of said end aperture. The other end aperture of the return duct is located near the entrance side of the pattern of urging grooves. It is obvious that with a given mutual separation of the two bearing parts after starting of the bearing a return of lubricant from the pressure chamber to the entrance side of the pattern of urging grooves is obtained in a measure which depends upon the value of said mutual axial displacement of the bearing parts. As already noted, it is necessary for a good operation that the annular sealing surfaces of the two bearing parts are very accurately machined. These sealing surfaces are subject to strong detrition. In addition, said known bearing has the above described drawback of a high static resistance against axial load. The return duct of the known bearing cannot be used in a bearing according to the present invention in which said static resistance has been made very small by the use of a centric substantially punctiform contact place.

However, it has been found possible to use at least the principle of the return duct in a bearing according to the invention and even in such manner that as a result of this no exceptional requirements are imposed upon the machining of the relative surfaces of the bearing part. An alternative favourable embodiment of a hydrodynamic sliding bearing according to the invention in which at least one of the two bearing parts comprises a return duct an end aperture which is sealed when the bearing is stationery and is released by a mutual axial displacement of the bearing parts in the operating condition of the bearing, said duct in the said operating condition interconnecting the pressure chamber with a chamber communicating with the entrance side of the pattern of urging grooves, is characterized according to the present invention in that said end aperture is located at the area of a cylindrical part of the surface of the bearing part comprising the duct.

The invention will now be described in greater detail, by way of example with reference to the drawing which shows diagrammatically and partly in cross-sectional view two embodiments of the bearing according to the invention.

Figure 1:
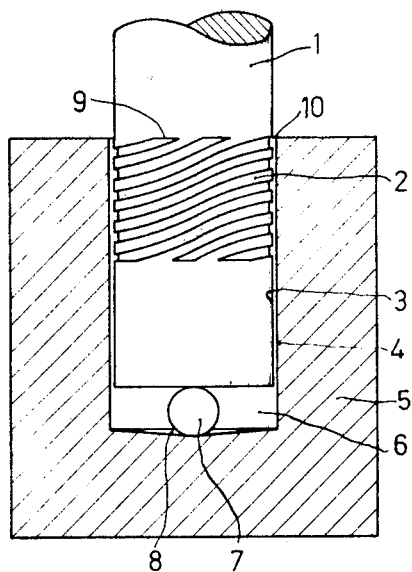
FIGURE 1 shows a bearing in which when the bearing is stationary the substantially punctiform contact place is realized by using a ball in the pressure chamber. In this bearing the adaptation of the axial load-carrying capacity of the bearing to the prevailing operating conditions is reached by providing the pattern of urging grooves in accordance with the invention.

Both figures show the bearings in the stationary condition. To avoid complexity of the drawing, the lubricant is not shown.

In the bearing shown in FIGURE 1, the pattern 2 of urging grooves is provided on the shaft 1 and urges the lubricant, for example, oil or grease, during operation of the bearing from the top to the bottom between the cylindrical surfaces 3 of the shaft and 4 of the bore in the journal housing 5 to the pressure chamber 6. The radial load-carrying capacity of the bearing is provided by the hydrodynamic lubricant pressure between the surfaces 3 and 4 and the axial load-carrying capacity by the pressure in the chamber 6. When the shaft is stationary the axial load is carried by a thrust member or ball 7 which is located in a centric shallow depression 8 of the bearing part or journal housing 5. By using the depression 8 the ball 7, when stationary, will nearly always be centrally located in the pressure chamber. Therefore, when the bearing is stationary, a substantially punctiform or point contact exists between the end-face of the shaft 1 and the ball 7, so that the torque required for starting the bearing is reduced to very small proportions. In the embodiment of the bearing shown in FIGURE 1, the entrance side 9 of the pattern 2 extends, at least in the stationary position of the bearing shown, to the extreme edge 10 of the cylindrical bearing surface 4. As a result of this, when a mutual axial separation of the bearing parts 1 and 5 occurs during starting or during operation, the effective length of the pattern 2 of urging grooves will become smaller so that the efficiency of the pattern will decrease, In this manner the bearing adapts itself to the prevailing operating conditions.

Figure 2:
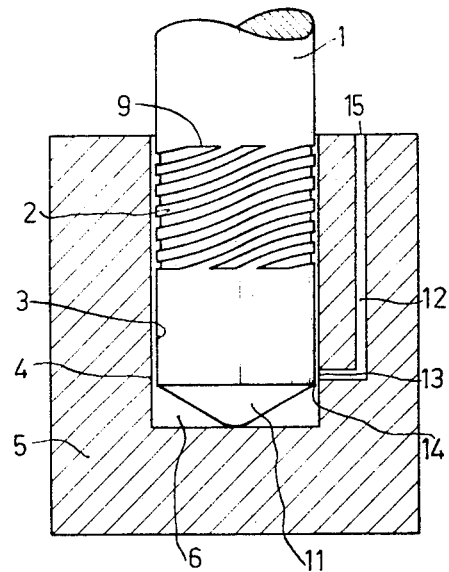
FIGURE 2 shows another bearing according to the invention in which a substantially punctiform contact place is obtained by constructing the end face of the shaft as a conical surface which is slightly rounded at the top. The self-adjusting action of the bearing is obtained in this case by using a return duct in the manner suitable according to the invention.

In the other bearing according to the invention shown in FIGURE 2, components of the bearing corresponding to components shown in FIGURE 1 are denoted by the same reference numerals.

In the bearing shown in FIGURE 2, the shaft 1 comprises an end-face which at its end is constructed as a slightly rounded conical surface 11 as a result of which in this bearing, the desired, substantially punctiform contact place between the bearing parts 1 and 5 is obtained when the bearing is stationary and the conical surface serves as a thrust member for axial loads.

As already described, the self-adjusting effect of the bearing shown in FIGURE 2 is reached by using a return duct 12. In the stationary condition of the bearing the end-aperture 13 is located at such a distance, which in practice is very close to the edge 14 of the cylindrical bearing surface 3 of the shaft 1 so that with mutual axial separation of the bearing parts 1 and 5, the aperture 13 is at least partly exposed so that return of the lubricant from the pressure chamber 6 through the duct 12 and its other end aperture 15 to the entrance side 9 of the pattern 2 becomes possible.

The drawing shows only two embodiments and only a few other embodiments of the bearing according to the invention were briefly described above. It is obvious, that many other variations of the bearing according to the present invention are possible.

What is claimed is:

1. A hydrodynamic sliding bearing having means for supporting both radial and axial loads and comprising a cylindrical shaft, a journal housing having a bore for slidably accommodating said shaft, a groove pattern formed in the shaft for urging a lubricant between said shaft and the surrounding bore surfaces to thereby produce a hydrodynamic pressure and to provide radial load carrying support for the shaft; the end of the shaft within the bore and the closed end of the bore defining therebetween a chamber wherein the hydrodynamic pressure produced during rotation of the shaft will provide axial load carrying support therefore; thrust means in the said chamber having point contact with the end of the bore for reducing the starting rotational torque of the shaft and for providing axial support for the shaft when stationary; and self-adjusting means for varying the hydrodynamic pressure through the sliding axial displacement of the shaft with respect to the bore and in response to said pressure.

2. A hydrodynamic sliding bearing as claimed in claim 1, wherein the thrust means comprises a spherical body arranged between the end of the shaft and the end of the bore; the end of the bore being shaped to provide for positioning of the spherical body on the axis of rotation of the shaft.

3. A hydrodynamic sliding bearing as claimed in claim 2, wherein the end of the bore defines a shallow depression for centrally positioning the spherical body.

4. A hydrodynamic sliding bearing as claimed in claim 3, wherein the groove pattern has groove entrances coinciding with the circumferential edge at the open end of the bore when the shaft is stationary, and during rotation the sliding axial displacement of the shaft out of the bore in response to the hydrodynamic pressure will provide for self-adjustment of the said pressure by reducing the effective groove length.

5. A hydrodynamic sliding bearing as claimed in claim 1, wherein the thrust means comprises a conical extension of the end of the shaft within the bore, the apex of said conical extension being in point contact with the end of the bore when the shaft is stationary.

6. A hydrodynamic sliding bearing as claimed in claim 5, wherein the journal housing defines therein a passageway having a first aperture adjacent the groove pattern and a second aperture defined by the bore surface and positioned above the said chamber when the shaft is stationary, such that during rotation the sliding axial displacement of the shaft out of the bore will provide for self-adjustment of the hydrodynamic pressure by exposing the chamber to the second aperture to permit transfer of the lubricant through the passageway.

References Cited

UNITED STATES PATENTS

| 1,928,525 | 9/1933 | Etheridge | 308—169 |
| 2,287,204 | 6/1942 | Smith | 308—168 |
| 3,154,353 | 10/1964 | Horingx et al. | 308—9 |
| 3,376,083 | 4/1968 | Muijderman | 308—9 |

FOREIGN PATENTS 735,932  9/1932  France.

MARTIN P. SCHWADRON, Primary Examiner

F. SOSKO, Assistant Examiner

U.S. Cl. X.R.

308—172